United States Patent [19]

Mai

[11] 4,329,601
[45] May 11, 1982

[54] STEPPING MOTOR

[75] Inventor: Tu X. Mai, Chavannes, Switzerland

[73] Assignee: Societe Suisse pour l'Industrie Horlogere Management Services S.A., Bienne, Switzerland

[21] Appl. No.: 122,955

[22] Filed: Feb. 20, 1980

[30] Foreign Application Priority Data

Feb. 22, 1980 [FR] France .................................. 79 06030

[51] Int. Cl.³ ............................................. H02K 37/00
[52] U.S. Cl. .................................. 310/49 R; 318/696; 368/76
[58] Field of Search .................... 318/696; 310/49, 46, 310/40 MM, 162–165; 58/23 D

[56] References Cited

U.S. PATENT DOCUMENTS

| | | | |
|---|---|---|---|
| 3,596,119 | 7/1971 | Goldmann | 310/49 |
| 3,597,915 | 8/1971 | Aizawa et al. | 310/49 V X |
| 3,979,616 | 9/1976 | Stechmann | 310/49 |
| 3,991,332 | 11/1976 | Kawamura et al. | 310/49 |
| 4,048,548 | 9/1977 | Nakajima et al. | 318/696 X |
| 4,055,785 | 10/1977 | Nakajima et al. | 318/696 X |
| 4,066,947 | 1/1978 | Nakajima et al. | 310/49 X |

FOREIGN PATENT DOCUMENTS

| | | | |
|---|---|---|---|
| 2628583 | 7/1977 | Fed. Rep. of Germany | 310/49 |
| 2808534 | 9/1978 | Fed. Rep. of Germany | 310/49 |
| 2373817 | 12/1977 | France | 310/40 MM |

*Primary Examiner*—Donovan F. Duggan
*Attorney, Agent, or Firm*—Griffin, Branigan & Butler

[57] ABSTRACT

A single phase bipolar stepping motor is described wherein the rotor is capable of bidirectional rotation. The rotor is so dimensioned that a combination of its moment of inertia J, its volume V and the number of pole pairs p satisfy the relation $J/(V \cdot p^{1.4}) \geq 5 \cdot 10^{-3}$ kg/m. Such a rotor will reliably step in the sense opposite to the preferred sense when the motor winding receives a first pulse of short duration followed by a second pulse of longer duration the polarity of which is inverted relative to that of the first pulse. The invention may find application to timepieces having hours and minutes hands.

5 Claims, 7 Drawing Figures

STEPPING MOTOR

BACKGROUND OF THE INVENTION

The present invention concerns an electromagnetic rotary stepping motor comprising a stator formed of soft ferromagnetic material and provided with a single exciting winding, and a rotor comprising a magnet having at least one pair of poles, the stator and the rotor of the motor being magnetically coupled in a manner to give the rotor a preferred sense of rotation in response to a first type of single alternating polarity pulses applied to the winding.

Electromagnetic stepping motors of this type are already well-known. The rotor of such a motor is subject to two types of moments: a static holding moment due to the flux of the permanent magnet and which defines the stopped position of the rotor when the motor is not fed with current (this also known as the reluctance moment) and a dynamic moment of the motor due to the interaction between the flux of the magnet and the flux created by the winding when the latter is fed by a current (also known as the mutual moment magnet-winding). It is the dynamic moment which provides the motor with the energy necessary for its rotation. In order to use such a motor in a timepiece for example it is necessary to fashion it in a manner such that it turns always in one sense in response to single pulses of alternating polarity applied to the winding. Such is the case of the motor described in Swiss Pat. No. 604,250 in which the angular shift of the stator relative to the fixed angular member determined at all times a preferential sense for rotation of the motor. It follows from the foregoing that the signals generally utilized for operating this motor and which appear in the form of single pulses polarized once in one sense and once in the other sense are inapt to effect turning of the rotor in a sense opposite to that preferred.

The purpose of this invention is to drive the rotor of the motor in a sense opposite to that normally preferred, thereby to be able to turn at least one of the hands of the timepiece in a sense opposite to the normal sense. Such a movement may be desirable particularly if one should desire for example to rapidly reset the hour in a timepiece provided with an analogic type display or again, if in employing a recent invention which uses momentarily the minutes hand as a seconds hand, one should desire to return the display to the original time shown. In order to accomplish this one provides the motor winding with a composite signal which may be provided on demand through the operation of a control button.

Monophase electromagnetic bipolar motors are known in which a special signal is applied with the purpose of changing the sense of the rotation.

In the French Publication No. 2,373,817, there has been described a system in which a pulse is applied to the winding in phase opposition just before a normal pulse and detection means operate in order to detect the position of the rotor so as to pass from one pulse to the other at the right moment in order to reverse the rotation sense of the rotor. Such a system presents at least two difficulties: firstly it is reversible i.e. if following a shock the rotor should accidentally advance through a step the composite pulse following will cause the rotor to continue in the preferred sense. Further there is necessity for a sophisticated system of adjustment which controls the switching of the pulses.

In the U.S. Pat. No. 4,112,671 other means are described for reversing the rotation sense of the rotor, in particular a group of pulses 10,11 and 12 as shown in FIG. 5 of this patent is arranged to reverse the sense of rotation of the rotor. This control system is associated with a rotor having a small moment of inertia relative to the volume of the rotor. If the couple or torque developed by the motor is sufficient to drive the mehanism of the timepiece in a forward direction its value is reduced by three times when the reverse operation is engaged and one may conclude that this function is by no means reliable whereby steps may be lost. If such should not present a major difficulty at the time of resetting the time, it will be appreciated that the loss of a step in a watch where one utilizes the minutes hand as a seconds hand will bring about a loss of the real time when one wishes to return to displaying the minute.

In the German publications DEOS No. 2,808,534 and DEOS No. 2,628,583 there is likewise described an arrangement for reversing the rotation sense of a motor. In order to step the rotor in the sense opposite the preferred sense, the winding is fed with a first pulse the polarity of which effects rotation of the rotor through an angle less than that corresponding to a full step in the preferred sense. This is followed by a second pulse of opposite polarity which effects turning of the rotor through a step in the sense opposite to the preferred sense. Both of these publications are concerned with facilitating setting of a watch. The first-mentioned recognizes that the reverse operation provides less output then the forward and that steps may be lost. The second is silent on this subject and gives no guarantee of reliable operation in both senses of rotation.

SUMMARY OF THE INVENTION

It is a purpose of this invention to eliminate the foregoing difficulties and to obtain a reliable stepping motor by suppressing the dangers of accidental reversal and a loss of one or several steps.

The electromagnetic motor according to the invention is characterized in that the moment of inertia J, the volume V and the number of pole pairs p of the rotor combine to satisfy the relation $$\frac{J}{V \cdot p^{1,4}} \geqq 5 \cdot 10^{-3} \text{ kg/m}$$

said rotor being driven in the sense of rotation opposite to the preferred sense when the winding receives a second type of doubled pulses of alternating polarity composed of a first pulse portion the polarity of which turns the rotor through an angle less than that corresponding to a step in the preferred sense, said first pulse portion being immediately followed by second pulse portion of opposite polarity which effects turning of the rotor through a whole step in the sense opposite to the preferred sense.

DETAILED DESCRIPTION OF THE INVENTION

Figure 1A:
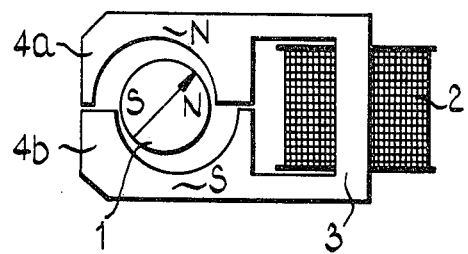
FIGS. 1a, 1b and 1c represent respectively a theoretical arrangement of a single phase motor, drive signals for this motor, and the value of the moments as the function of the angle or rotation of the motor in the preferred sense and in accordance with the prior art.

FIG. 1a represents in a very schematic manner a theoretical arrangement of a single phase bipolar stepping motor. A permanent cylindrical magnet 1 diametrically magnetized SN constitutes the rotor of this motor. The stator includes a winding 2, which when excited provides a magnetic flux which is transmitted to the air-gap by means of the yoke 3 and the pole pieces 4a and 4b obtained from a soft ferromagnetic material. In a stopped position the rotor occupies the position of minimum reluctance such as shown by FIG. 1. Should a positive pulse be transmitted to the winding the rotor will turn through one step, i.e. through 180°; a second pulse this time negative, will permit the rotor to continue in the same sense and to effect thus a further step and so on. This will be referred to as the preferred sense of rotation.

Figure 1B:
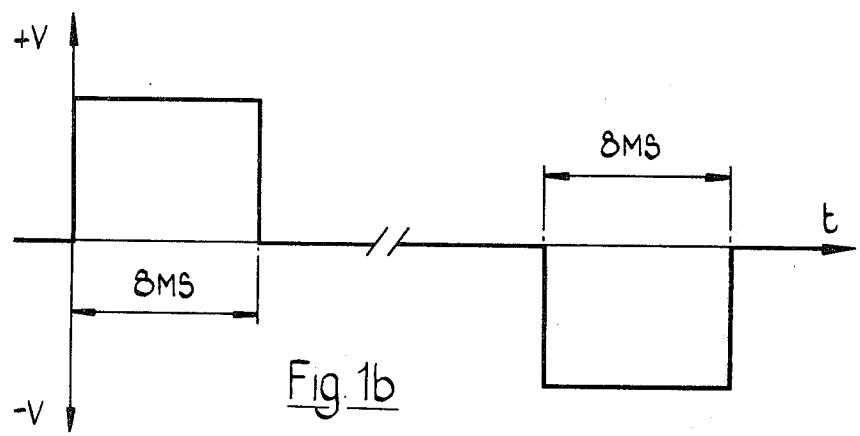

FIG. 1b represents as a function of time a first type of simple pulses of alternating polarity which will cause the motor to advance in the preferred sense. The duration of each pulse is generally in the order of 8 ms.

Figure 1C:
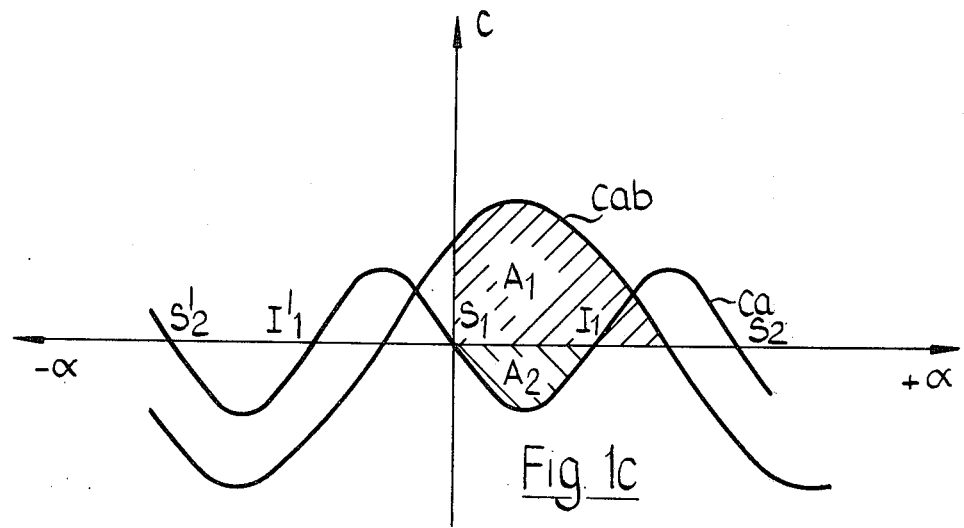

FIG. 1c represents the value of the moments C which act on the rotor as a function of its angle of rotation $\alpha$. The preferred sense is that of the positive values of the rotational angle $\alpha$ and the opposite sense is that of the negative values of the angle of rotation $\alpha$. As already mentioned above the rotor of the motor is subject to two types of moments: A static or holding moment Ca due to the magnet alone and a dynamic or motor moment Cab due to the interaction of the magnet flux with the flux of the winding when the latter is fed with a pulse. In view of the construction of the motor these moments are displaced through 45° relative to one another. Should a positive pulse feed the winding the pole 4a will become a north pole and the pole 4b a south pole (see FIG. 1a) and the rotor will turn through 180° in the clock-wise sense. Points $S'_2$, $S_1$ and $S_2$ are points of stable equilibrium in the absence of current (point $S_1$ represents the position of the rotor such as shown on FIG. 1a), while points $I'_1$ and $I_1$ are points of unstable equilibrium. In the preferred sense of rotation the rotor is brought from the point $S_1$ to the point $I_1$ by the mutual moment Cab, the remainder of the course from $I_1$ to $S_2$ being accomplished thanks to the kinetic and potential energies stored between $S_1$ and $I_1$. The surface $A_1$ represents the useful energy which one may furnish to the motor in the preferred sense of rotation. Surface $A_2$ represents the holding or positioning energy (to which it is necessary to add the energy due to loss by friction). Since these two energies are of opposite senses it is necessary in order that the rotor may advance through a step that $A_1$ be superior to $A_2$, which is the case for stepping motors of the known types.

Figure 2:
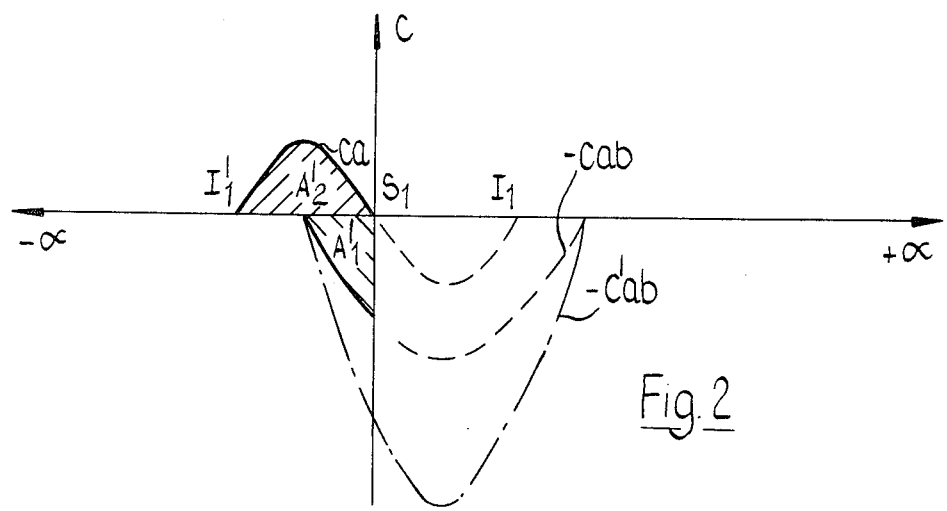
FIG. 2 represents the value of the moments as a function of the angle of rotation of the rotor of the motor if the drive pulses are of a polarity inverted relative to that of FIG. 1b.

FIG. 2 shows the value of the moments as a function of the angle of rotation of the rotor and the feed pulses are of inverted polarity relative to those shown in FIG. 1b. It may well be asked if in the method of feeding as in FIG. 1b, it would not suffice in order to attain the purpose of the present invention, simply to invert the polarity of the control signal in order to invert the rotation sense of the motor. FIG. 2 shows once again the holding couple Ca of which the polarity and the amplitude have not changed since they are dependent on the magnet alone. The amplitude of the mutual moment Cab is also the same, since resulting from a pulse of the same amplitude, but its polarity is inverted since resulting from a pulse of opposite polarity. It will be here noted that the useful energy that one may furnish to the motor as shown by the surface $A'_1$ is smaller then the holding energy $A'_2$. Consequently the rotor cannot turn through a step in the sense opposite that of the preferred sense. One could arrive at the present purpose by increasing the amplitude of the pulse which would provide the couple $C'$ ab but this would cause a major difficulty in the obtaining of the control feed.

Figure 3A:
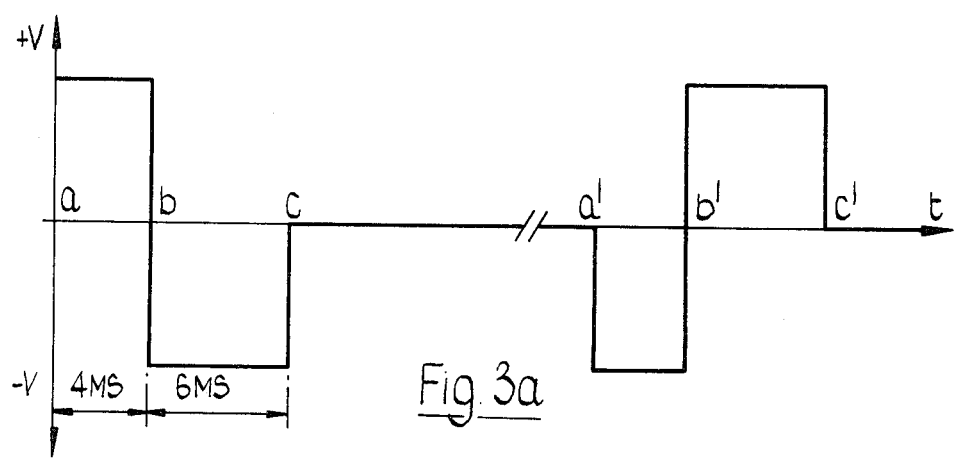
FIGS. 3a and 3b represent respectively a drive signal of this motor and the values of the moments as a function of the angle of rotation of the rotor for the sense opposed to the preferred sense according to the present invention.

FIG. 3a represents a type of double pulses having alternative polarity arranged in order to effect turning of the rotor in a sense opposite to the preferred sense and in accordance with this invention. It will be seen however that this arrangement is not sufficient to guarantee reliable operation for the reverse sense of rotation if the moment of inertia, the volume and the number of pole pairs of the rotor do not satisfy at the same time a necessary condition which will be illustrated further on. The signal in question is comprised of a first positive pulse ab which causes the rotor to turn through an angle less then one step in the preferred sense, followed immediately by a second pulse bc which inverts the sense of rotation and causes the rotor to turn through one step in the sense opposed to the preferred. The duration of the first pulse is chosen to be between 2 and 5 ms and the duration of the second pulse may be chosen to be between 4 and 10 ms. In the preferred version of invention the respective durations are 4 ms and 6 ms.

Figure 3B:
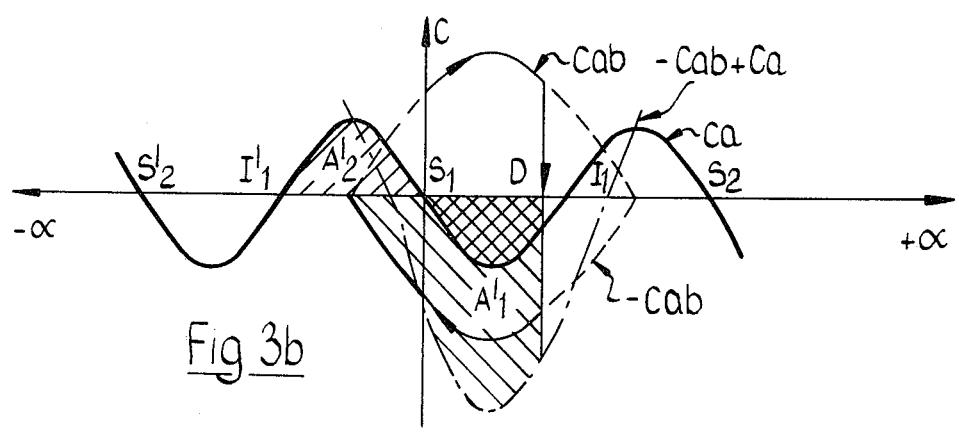

FIG. 3b illustrates graphically the moments obtained during operation of the motor according to the invention when the latter is fed by the signal of FIG. 3a. In order to furnish sufficient energy in the sense opposite to the preferred sense the motor should start from a position different from the stable position $S_1$ as would be the case for normal operation. To obtain this, the rotor is brought initially from the point of stable equilibrium $S_1$ to the point D by a pulse which will urge the rotor in the preferred sense. When the rotor arrives at point D the feed voltage is inverted, and this causes the motor to start up in the sense opposed to the preferred sense with a large acceleration moment. The duration of each of these pulses will depend from the characteristics of the motor (electrical and mechanical time constants) and will thus be adapted to a given motor. The surfaces $A'_1$ represents the useful energy which may be furnished to the motor according to this feed method. It is constituted on one hand by the mutual moment $-$Cab and on the other hand by the accumulated potential energy when the motor has been displaced in the preferred sense from $S_1$ to D (surface double hatched). It may be seen that at the resulting surface $A'_1$ as bounded by the curves $-$Cab $+$Ca is greatly superior to the surface $A'_2$ which represents the holding energy in the sense opposed to the preferred sense; consequently the pulse described here will displace the rotor one step in the sense opposed to the preferred in order to stop at the position of stable equilibrium $S'_2$. If next a similar signal but of inverted polarity is applied to the winding the rotor will continue its rotation in the same sense (signal a'b'c').

It will now be shown that the signal as described above may not apply to any motor whatsoever in order to obtain reverse rotation. If one designates by $\psi$ the angular velocity of the rotor and by F the coupling factor (=Flux due to the magnet passing through the coil x the number of windings x the number of pole pairs), one may define the induced voltage Ui at the terminals of the motor as $Ui = F \cdot \psi$. It has already been shown that the combined effort of the kinetic and potential energy permits the rotor to arrive at its point of stability $S'_2$. The acceleration moment in the reverse operation is thus found to be much more important than that of the normal rotation sense and consequently if the motor has a low moment of inertia the angular velocity may become very large and thus, according to the equation, above the induced voltage Ui may exceed feed voltage U: the current i in the winding which responds to the equation $$i = \frac{U - Ui}{R}$$

may then become negative (one here neglects the effect of self inductance). Under these conditions the acceleration moment Cacc which responds to the relationship $$Cacc = -F \cdot i + Ca$$

may become positive, this signifying clearly that this moment becomes a deceleration moment or braking moment since it acts in the preferred sense $+\alpha$. Under these conditions the rotor is no longer assured of reaching point $S'_2$. In order to maintain the angular velocity within reasonable limits and if one designates by J the moment of inertia of the rotor and by t the time, the equation $$\omega = \frac{Caac}{J} \cdot t$$

shows that it is necessary to increase the value of J. This artifice presents the great advantage of providing the rotor with a moment in its reverse rotation almost as great as that for the advance rotation. One thus maintains the security spread (from 3 to 5) which must exist between the moment furnished by the motor and the resisting mechanical moment of a watch in both senses of rotation of the motor. The rotor is also less sensitive to variations during manufacture.

The increase in the moment of inertia may be obtained by increasing its mass or its radius. On the other hand in order to obtain a rule which may be applied in all cases which may be presented, it is necessary to relate the said moment of inertia J to the volume V and to the number of pole pairs p of the rotor. To give a figure to the quality factor which the rotor should posses in order to rotate reliably in both senses and in response to the control pulses the relationship $J/(V \cdot p^{1,4})$ has been found as characterising a parameter of good function. If $$J = \tfrac{1}{2} M \cdot r^2 = \tfrac{1}{2} Y \cdot V \cdot r^2$$

then $$\frac{J}{V \cdot p^{1,4}} = \frac{\gamma \cdot r^2}{2 \cdot p^{1,4}}$$

where M represents the mass, r the radius and Y the density of the rotor.

In a motor according to the prior art such as for example that described in the U.S. Pat. No. 4,112,671 already mentioned, the rotor is manufactured of a magnet of samarium-cobalt ($Y = 8 \cdot 10^3$ kg/m$^3$), its radius is $0{,}8 \cdot 10^{-3}$ m, the number of pole pair is 1 and the ratio $J/(V \cdot p^{1,4}) = 2{,}56 \cdot 10^{-3}$ kg/m. For this value the moment for the forward motion is $4{,}5 \cdot 10^{-7}$ Nm and for the reverse motion is only $1{,}5 \cdot 10^{-7}$ Nm. The latter is insufficient to drive reliably the mechanism in the reverse sense which would require a minimum moment of $1 \cdot 10^{-7}$ Nm (experimental value).

In another motor according to the prior art such as that shown in Swiss Pat. No. 604 250 the rotor is made from a magnet of platinum-cobalt ($Y = 16 \cdot 10^3$ kg/m$^3$) and possesses 6 pairs of poles, its radius being $2{,}2 \cdot 10^{-3}$ m. The ratio $J/(V \cdot p^{1,4}) = 3{,}5 \cdot 10^{-3}$ kg/m. Measurements undertaken on this motor show that it will not function reliably in a reverse direction if one applies the pulse train as shown in the present invention.

In a motor in accordance with this invention the rotor is made of a magnet of platinum-cobalt ($Y = 16 \cdot 10^3$ kg/m$^3$) having one pair of poles, its radius being $1 \cdot 10^{-3}$ m. The ratio $J/(V \cdot p^{1,4}) = 8 \cdot 10^{-3}$ kg/m. For this value the moment for the forward operation is $5{,}5 \cdot 10^{-7}$ Nm and that for the reverse operation is $4{,}5 \cdot 10^{-7}$ Nm. It may thus be seen that the moment for the reverse operation is not greatly different from that from the forward operation and the ratio is approximately 1,2. Thus the mechanism may be driven reliably in both senses.

From what has preceded and from other measurements made on other motors currently known timepieces require the quality factor $J/(V \cdot p^{1,4})$ to be equal or greater then $5 \cdot 10^{-3}$ kg/m. In order that the motor may function reliably in the reverse sense when one applies signals in accordance with the invention. Under these conditions one may equally observe that the ratio of the moment of the motor in the preferred sense to the moment in the opposite sense is less than 1,5.

The heaviness of the rotor and thus the reliability of operation in both senses in penalized by an increase in the consumption of the motor consequently the invention is less suitable for a watch provided with a seconds hand where the motor makes one step each second.

On the other hand it may be applied particularly well to a watch provided with an hours hand and a minutes hand alone, wherein the motor makes one step only each minute and where the problem of consumption is much less important. In this case the reverse movement may be utilized to restore the display of the minute when one employs the minutes hand temporarily as a seconds hand as already mentioned in the introduction.

Finally it will be noted that the method of operation in the accordance with the invention is not accidentally reversible. Let us suppose that a shock be applied accidentally to the watch. This may cause the rotor of the motor to advance through one step in the absence of a pulse exciting the winding. If the signal a'b'c' should be present (in place of the signal abc) the rotor will be unable to traverse a step either forwardly or in reverse. On the other hand the following signal abc will find the rotor in a good position to be started off in the reverse direction.

Figure 4:
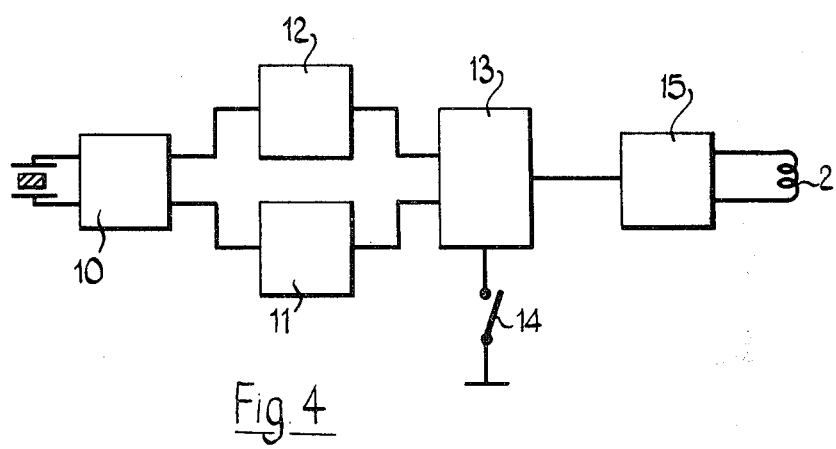
FIG. 4 is a block diagram showing a possible feed arrangement for the present motor for the inverted sense of rotation.

The various pulses necessary for the realisation of the invention are produced in an electronic logic circuit which may benefit from the multiple signals normally available at the output of the frequency divider of the timepiece. FIG. 4 shows a block diagram of such a circuit. Signals taken from the frequency divider 10 are transmitted to a pulse forming circuit 11 for the single signals of the forward operation 11 and to a pulse forming circuit 12 for the double pulses for the reverse operation. The output of the circuits is connected to a switching arrangement 13 at the output of which may appear the pulse trains either of the single of double form in accordance with the position of switch 14. The chosen signal is then applied to circuit 15 which realises at the same time the alternating polarity necessary and the control of the winding 2 of the motor.

What is claimed is:

1. Rotary electromagnetic stepping motor comprising a stator formed of soft ferromagnetic material provided with a single exciting winding and a rotor formed by a magnet having at least one pair of poles, stator and rotor being magnetically coupled in a manner to give the rotor a preferred sense of rotation in response to a first type of single alternating polarity pulses applied to the winding wherein the moment of inertia J, the volume V and the number of pole pairs p of the rotor combine to satisfy the relation $J/(V \cdot p^{1,4}) \leq 5 \cdot 10^{-3}$ kg/m said rotor being driven in the sense of rotation opposite to the preferred sense when the winding receives a second type of doubled pulses of alternating polarity composed of a first pulse portion the polarity of which turns the rotor through an angle less than that corresponding to a step in the preferred sense, said first pulse portion being immediately followed by a second pulse portion of opposite polarity which effects turning of the rotor through a whole step in the sense opposite to the preferred sense.

2. A motor as set forth in claim 1 wherein the first pulse portion is of shorter duration than the second pulse portion.

3. A motor as set forth in claim 2 wherein the first pulse portion has a duration between 2 and 5 ms and the second pulse portion has a duration between 4 and 10 ms.

4. A motor as set forth in claim 1 wherein the ratio of the output torque in the preferred sense of rotation to the output torque in the opposite sense is less than 1,5.

5. A motor as set forth in claim 1 wherein said motor is arranged and adapted to drive a timepiece.

* * * * *

UNITED STATES PATENT AND TRADEMARK OFFICE
CERTIFICATE OF CORRECTION

PATENT NO. : 4,329,601
DATED : May 11, 1982
INVENTOR(S) : Mai Tu Xuan

It is certified that error appears in the above—identified patent and that said Letters Patent is hereby corrected as shown below:

On the title page
Please change the name of the inventor from "Tu X. Mai" to --Mai Tu Xuan--.

Signed and Sealed this

Thirty-first Day of August 1982

[SEAL]

Attest:

GERALD J. MOSSINGHOFF

Attesting Officer  Commissioner of Patents and Trademarks